(12) United States Patent
Narasimhamurthy et al.

(10) Patent No.: US 9,270,636 B2
(45) Date of Patent: Feb. 23, 2016

(54) NEIGHBOR LOOKUP OPERATIONS IN A NETWORK NODE

(71) Applicant: Oracle International Corporation, Redwood Shores, CA (US)

(72) Inventors: Giridhar Narasimhamurthy, Bangalore (IN); Bharadwaj Raghavendra Gosukonda, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 95 days.

(21) Appl. No.: 14/246,160

(22) Filed: Apr. 7, 2014

(65) Prior Publication Data

US 2015/0288655 A1     Oct. 8, 2015

(51) Int. Cl.
*H04J 3/24*      (2006.01)
*H04L 29/12*    (2006.01)
*H04W 28/12*   (2009.01)
*H04L 12/743*   (2013.01)

(52) U.S. Cl.
CPC .......... *H04L 61/255* (2013.01); *H04L 61/2046* (2013.01); *H04W 28/12* (2013.01); *H04L 45/7453* (2013.01)

(58) Field of Classification Search
CPC ......................................................... H04J 3/24
USPC ......................................................... 370/475
See application file for complete search history.

*Primary Examiner* — Shripal Khajuria
(74) *Attorney, Agent, or Firm* — IPHorizons PLLC; Narendra Reddy Thappeta (57) ABSTRACT

A network node maintains a neighbor data structure in the form of a hash table containing multiple buckets for storing mapping entries, with each entry specifying a local address corresponding to a global address. The table is based on a hash function that generates a corresponding hash value for each global address. Each bucket is associated with a unique hash value and is implemented as a corresponding balanced tree containing a corresponding set of nodes, with each node storing a corresponding mapping entry. Upon receiving a lookup request containing a first global address, the node determines a first bucket by applying the hash function to the first global address, and then traverses a first tree corresponding to the first bucket to find a first entry having a global address equaling the first global address. Concurrent non-blocking access is permitted to various portions of the tree during changes in the tree.

21 Claims, 5 Drawing Sheets

NEIGHBOR LOOKUP OPERATIONS IN A NETWORK NODE

RELATED APPLICATIONS

The present application is related to the following co-pending applications, which are both incorporated in their entirety into the present application:

1. Entitled, "Read and Write Operations on Shared Data Resources in Parallel Processing Systems", Ser. No.: 14/246, 158, Filed on even date herewith, naming as inventor GIRIDHAR NARASIMHAMURTHY.

2. Entitled, "Reducing Blocking Instances in Parallel Processing Systems Performing Operations on Trees", Ser. No.: 14/246,159, Filed on even date herewith, naming the same inventors as in the subject patent application.

BACKGROUND OF THE DISCLOSURE

1. Technical Field

The present disclosure relates to networked nodes, and more specifically to neighbor lookup operations in a network node.

2. Related Art

A network node refers to either a switch or an end system. End systems are the eventual source or destination of packets, while switches forward packets to provide connectivity between end systems.

End systems are typically viewed as being connected to corresponding local networks, with switches forwarding packets between the local networks. The networks thus connected are termed as Internet, and IP (Internet Protocol) is a common networking protocol used for internetworking, as is well known in the relevant arts.

Each network node may be viewed as having at least one associated global address and a local address. For example, IP protocol provides for a unique global address for each network node connected to the Internet. Such a global address enables a corresponding packet to be routed across potentially several intermediate networks before a packet is delivered to the eventual destination end system using IP.

On the other hand, local addresses are specific to the implementation of the local networks, and are typically relevant only for delivering packets within the local network. For example, assuming a local network is implemented compatible with 802.3 Ethernet standards, the medium access control (MAC) Ethernet address specified according to the standards represents the local address.

Network nodes often are required to perform neighbor lookup operations. A neighbor lookup operation entails mapping global/IP address (already specified in a packet) to corresponding local/MAC address of a next (neighbor) network node on the same local network, to which the packet is to be forwarded. The local address thus determined is used to deliver the packet to the next network node.

As the same mapping information is potentially required for forwarding several other later packets to the same next network node, the information is maintained in a memory for supporting additional lookup operations. As a network node can forward packets to multiple neighbors, mapping information corresponding to all such neighbors may also be maintained in the memory.

It is generally desirable that the lookup operations be implemented to meet the requirements (e.g., throughput performance) of the corresponding network node. Aspects of the present disclosure facilitate such requirements to be met, at least in some environments, as described below.

BRIEF DESCRIPTION OF THE DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

An aspect of the present invention facilitates neighbor lookup operations in a network node. In one embodiment, a network node maintains a neighbor data structure in the form of a hash table containing multiple buckets for storing mapping entries, with each mapping entry specifying a local address corresponding to a global address. The hash table is based on a hash function that generates a corresponding hash value for each global address. Each bucket is associated with a unique hash value and is implemented as a corresponding balanced tree containing a corresponding set of nodes, with each node storing a corresponding mapping entry. The global addresses of mapping entries in each balanced tree generate the unique hash value associated with the bucket, upon applying of the hash function.

In response to receiving a lookup request containing a first global address, the network node determines a first bucket by applying the hash function to the first global address, and then traverses a first balanced tree corresponding to the first bucket to find a first mapping entry having a global address equalling the first global address.

By having a combination of a hash table with balanced trees, each lookup request can be processed with a fixed upper bound on the number of memory accesses, while keeping such upper bound to a reasonably low number. Accordingly, the throughput performance of the network node is enhanced.

In one embodiment, the received first global address is an IP address of a next network node to which a packet is to be forwarded. Accordingly, the first mapping entry is examined to identify a local/MAC address and the packet is forwarded to the next network node on a local network using the local/MAC address. For example, the network node is a router and the next network node is an end system, wherein the first global address is a destination global address of the end system.

According to another aspect of the present disclosure, in response to receiving a request to add a mapping entry containing a global address and a local address, a network node hashes the received global address to a specific hash value using a hash function. The hash value is used to identify a bucket associated with the matching hash value. Accordingly, the network node adds the received mapping entry as a new node to the balanced tree corresponding to the identified bucket. In one embodiment, the network node determines whether the specific hash value generated for the global address causes a collision in the hash table. The network node then adds the new node as a root of the balanced tree if collision is not determined, and adds the new node below the root otherwise.

According to one more aspect of the present invention, for adding a new node to a balanced tree, a network node first identifies a parent node to which the new node is to be added as a child according to an order required by the balanced tree, and then checks whether inclusion of the new node as the child of the parent node would cause imbalance in the balanced tree. If imbalance is caused, the network node changes the topology of the balanced tree, with the addition of the new node to ensure that the resulting tree is again balanced.

According to yet another aspect of the present invention, a network node receives a request to change a mapping entry in a same node of a balanced tree and also another request to lookup the mapping entry in the same node, with the requests being processed respectively by a first execution entity and a second executing entity executing concurrently in the network node. The network node then permits non-blocking access to the same node to both of the first execution entity and the second execution entity, thereby enabling the change of the mapping entry and the lookup to be performed concurrently.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
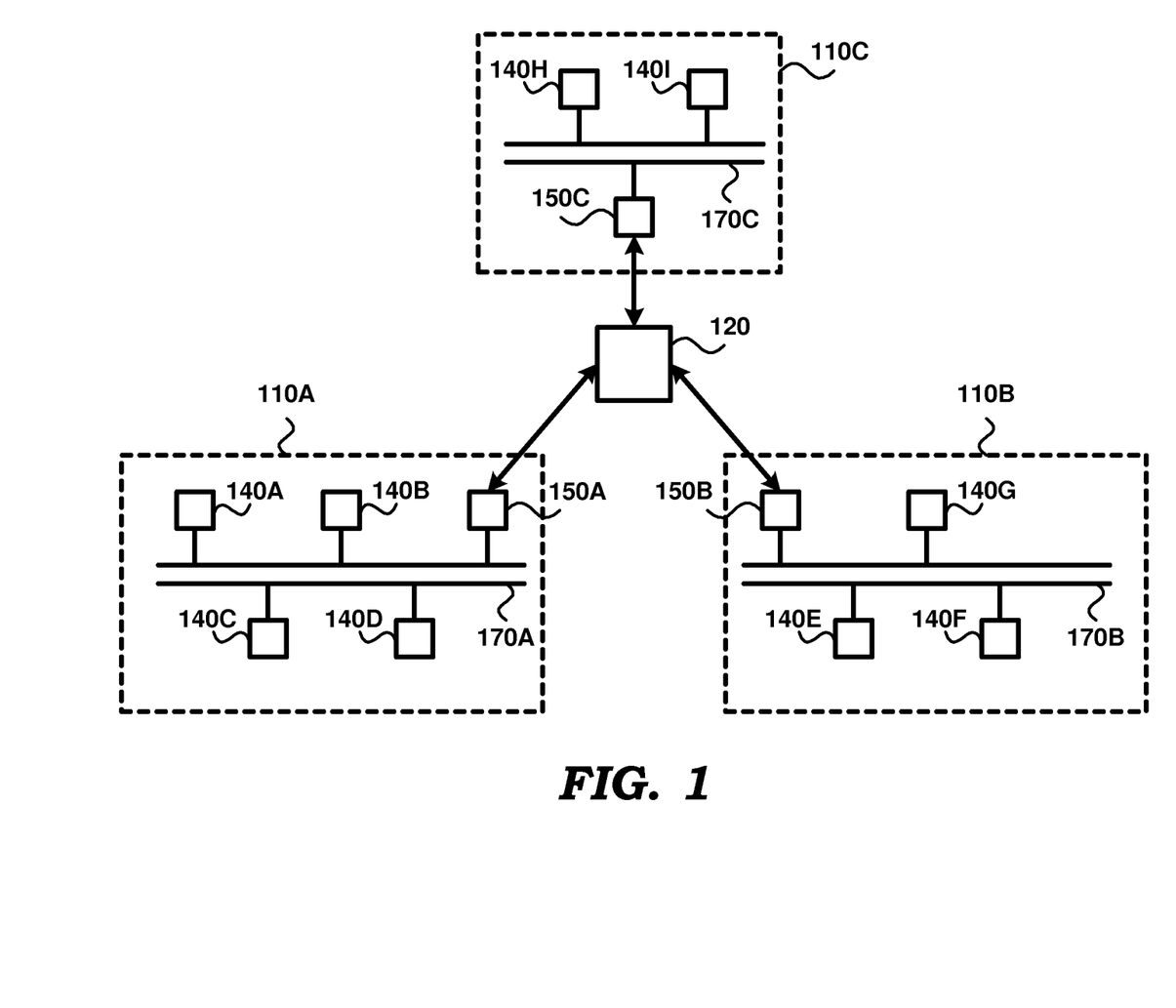
FIG. 1 is a block diagram illustrating an example Internetworked environment in which several aspects of the present disclosure can be implemented.

FIG. 1 is a block diagram illustrating an example Internetworked environment in which several aspects of the present disclosure can be implemented. The block diagram is shown containing three sites 110A-110C connected by Internet backbone 120. Site 110A is shown containing end systems 140A-140D and switch 150A, connected by local area network (LAN) 170A. Site 110B is shown containing end systems 140E-140G and switch 150B, connected by LAN 170B. Site 110C is shown containing end systems 110H-110I and switch 150C, shown connected by LAN 170C.

Merely for illustration, only representative number/types of systems are shown in the Figure. Many environments often contain many more systems, both in number and type, depending on the purpose for which the environment is designed. Each system/device of FIG. 1 is described below in further detail.

Each of end systems 140A-140I represents a digital processing system such as a client system (e.g., a personal computer, workstation, mobile station, mobile phones, computing tablets, etc), a server system, a data storage system, that accesses or are accessible over networks. Each end system may be viewed as being identified by at least one corresponding unique IP address globally (for internetworking), while having a local address on the corresponding LAN. For example, assuming LAN 170A-170C is implemented using 802.3 Ethernet standards, the local address corresponds to a MAC address.

An end system (or a physical interface in general, including those of switches) may also have more than one global address. The features of the present disclosure are described below assuming that each network node has only a single global address. In the scenario that a network node has multiple global addresses, all such global addresses can be mapped to one local address.

Each LAN 170A-170C represents a corresponding network providing connectivity between network nodes (i.e., switch and end systems) present in the corresponding site 110A-110C. All the network nodes (including the switches and end systems) connected to a LAN (or having an interface connected to the LAN) are viewed as neighbor nodes (in general, neighbors), since each of such nodes can deliver packets directly to the other neighbors without having to use a switch in between for forwarding packets. Backbone 120 extends the connectivity of the end systems of each site/LAN with end (remote) systems in other sites, for example using IP protocol. Backbone 120 may contain multiple switches to provide the IP connectivity. End systems may implement TCP/UDP type higher protocols for desired delivery reliability, etc.

In general, in TCP/IP environments, an IP packet is used as a basic unit of transport, with the source address being set to the IP address assigned to the source system from which the packet originates and the destination address set to the IP address of the destination system to which the packet is to be eventually delivered. A (IP) packet is said to be directed to a destination system when the destination IP address of the packet is set to the (IP) address of the destination system, such that the packet is eventually delivered to the destination system by the combination of backbone 120 and LANs in the path. When the packet contains content such as port numbers, which specifies the destination application, the packet may be said to be directed to such application as well. The destination system may be required to keep the corresponding port numbers available/open, and process the packets with the corresponding destination ports. Each of backbone 120 and LAN 170A-170C may be implemented using any combination of wire-based or wireless mediums.

Switches/routers 150A-150C receive and forward packets, to provide connectivity between end systems of different sites. For example, switch 150A may receive a packet (originating) from end system 140A, with the packet having a destination IP address of end system 140F, and forwards the packet to backbone 120 for eventual delivery to end system 140F via switch 150B. Similarly, switch 150A may receive packets from external sites via backbone 120 for delivering the packet to an end system (e.g., 140A), and accordingly such a packet is delivered to the end system using LAN 170A.

It may be appreciated that delivering each IP packet over a corresponding LAN requires identification ("lookup operation") of the MAC address corresponding to the end system (140F/140A in the above examples) having the destination IP address (of the packet). Such a need is present for end systems to communicate directly with other neighbors on the same LAN, as well as for each switch to deliver packets to end systems on the same (shared) LAN.

Accordingly each of the nodes may maintain in a memory, mapping information indicating the MAC address corresponding to various IP addresses of the nodes connected to the same LAN. The number of entries in such neighborhood table may be substantially more in the case of switches, due to the role in delivering (to local systems) packets received from external systems. At least to ensure a high throughput performance of the switches, it may be desirable that the potential upper bound on number of memory accesses/duration (for identifying the MAC address), be minimized.

Aspects of the present disclosure provide for neighbor lookup operations, while meeting at least some of the requirements noted above.

3. Neighbor Lookup Operations

Figure 2A:
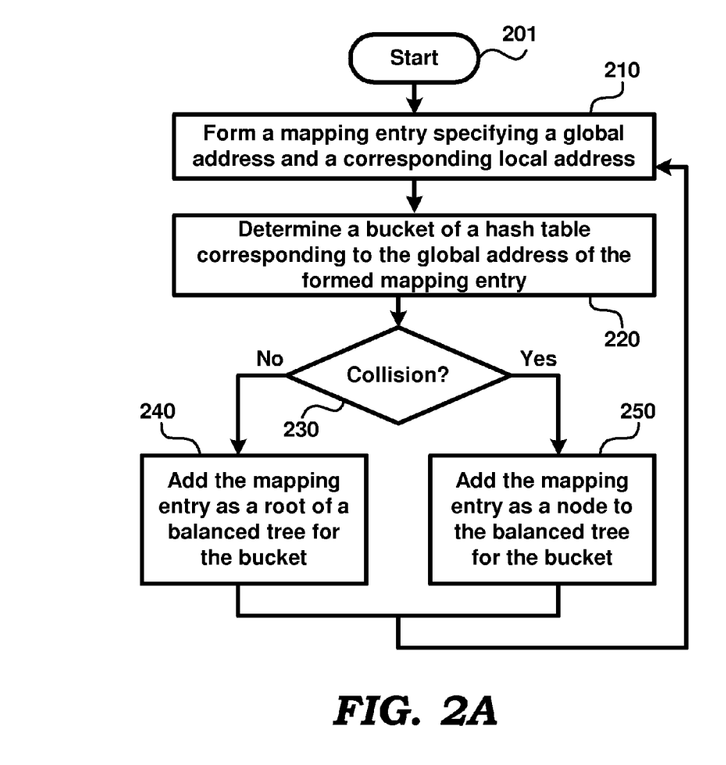
FIG. 2A illustrates the manner in which neighbor mapping information can be built in an embodiment.
Figure 2B:
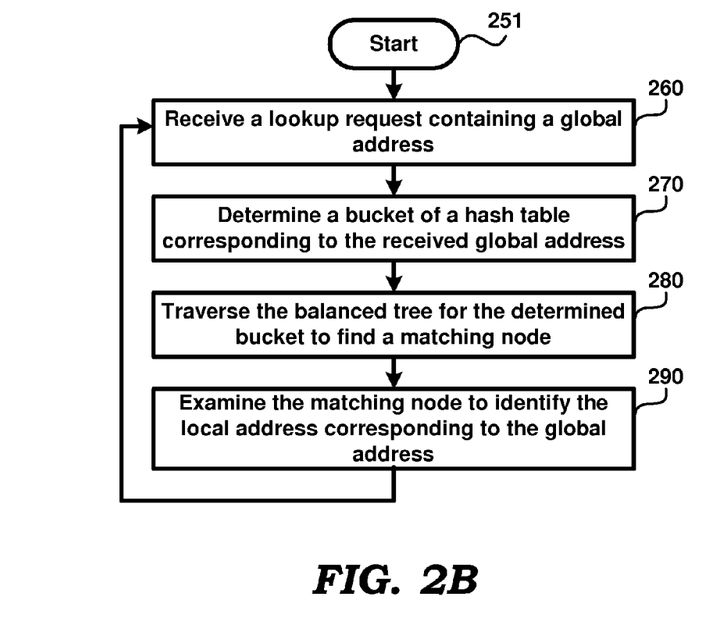
FIG. 2B illustrates the neighbor lookup operation in the context of existing mapping information (for example, built using the technique(s) of FIG. 2A) in one embodiment.

FIGS. 2A and 2B are flow charts together illustrating the manner in which neighbor lookup operations are performed in a network node according to an aspect of the present disclosure. In particular, FIG. 2A illustrates the manner in which neighbor mapping information can be built, while FIG. 2B illustrates the neighbor lookup operation in the context of the mapping information built using the technique(s) of FIG. 2A, and thus the two flowcharts are operative in parallel. Furthermore, the description is provided with respect to switch 150A, though the features can be implemented with other switches or end systems, as will be apparent to one skilled in the relevant arts.

In addition, some of the steps may be performed in a different sequence than that depicted below, as suited to the specific environment, as will be apparent to one skilled in the relevant arts. Many of such implementations are contemplated to be covered by several aspects of the present invention. The flow chart of FIG. 2A begins in step 201, in which control immediately passes to step 210.

In step 210, switch 150A forms a mapping entry specifying a global (IP) address and a corresponding a local (MAC) address. The mapping entry may be formed based on protocols such as address resolution protocol (ARP) as is well known in the relevant arts.

In step 220, switch 150A determines a bucket of a hash table corresponding to the global address of the formed mapping entry. The hash table is based on a hash function that generates a corresponding hash value for each global address, with each bucket being associated with a unique hash value. Accordingly, the hash function is applied to the received global address to generate a hash value, with the bucket uniquely associated with the generated hash value being identified as the bucket corresponding to the received global address.

In step 230, switch 150A checks whether the generated hash value causes a collision in the hash table. A collision is determined to have occurred in the hash table if there is at least one previous mapping entry (having a hash value same as the generated hash value) in the determined bucket. Collisions are possible since hash functions are often chosen to generate the same hash value for multiple input global addresses, typically for reducing space/time requirements. Control passes to step 240 if the determined bucket does not have any mapping entries and to step 250 otherwise.

In step 240, switch 150A adds the mapping entry as a root of the balanced tree for the determined bucket. In step 250, switch 150A adds the mapping entry as a node (under the root) of the balanced tree for the determined bucket. The adding of the node as a root or as a node to the balanced tree may be performed in a known way. Switch 150A may also check whether the addition of the node causes an imbalance in the balanced tree, and corresponding change the topology of the balanced tree, with the addition of the new node to ensure that the resulting tree is again balanced. Control passes to step 210 to process subsequently formed mapping entries.

Thus, as the neighbor information continues to be built in accordance with the flowchart of FIG. 2A, lookup requests may be processed in parallel in accordance with the flowchart of FIG. 2B described below.

Referring to FIG. 2B, the flow chart begins in step 251, in which control immediately passes to step 260. In step 260, switch 150A receives a lookup request containing a global (IP) address. For example, a packet may be received containing a global address of a next network node (e.g. 140A) to which the packet is to be forwarded.

In step 270, switch 150A determines a bucket of a hash table corresponding to the received global address. The determination may be performed similar to the determination in step 220 based on the received global address. As noted above, each bucket is implemented as a corresponding balanced tree containing one or more nodes, with each node storing a mapping entry having a global address and a local address.

In step 280, switch 150A traverses the balanced tree for the determined bucket to find a matching node. In other words, switch 150A examines the different nodes of the balanced tree, and at each node, compares the global address in the mapping entry stored in the node to the received global address, with a node determined to be the matching node when the global address stored in the node equals the received global address. The order of examination is according to the convention defining the structure of the balanced tree, and the convention in case of AVL tree is described in sections below.

In step 290, switch 150A examines the matching node (in particular, the mapping entry stored in the matching node) to identify the local (MAC) address corresponding to the global address. The identified local address may thereafter be sent as a response to the lookup request. In the above noted example, the received packet may be forwarded to the next network node (e.g. 140A) on a local network (e.g. LAN 170A) using the identified local address. For example, the destination MAC address field of the packet header is set to the identified MAC address (with IP packet being a payload of such a MAC packet) and transmitted on LAN 170A. Control passes to step 290 to process subsequent lookup requests.

It may be appreciated that applying of the hash function and identification of the specific balanced tree/bucket can be performed in a fixed duration. Due to the property of a balanced tree ensuring minimal height, the traversal of the specific balanced tree to find the matching node/mapping entry can be performed with a low and fixed upper bound on the number of nodes accessed. Thus, the throughput performance of the network node may be improved. The description is continued with respect to some illustrative examples.

4. Illustrative Example

Figure 3A:
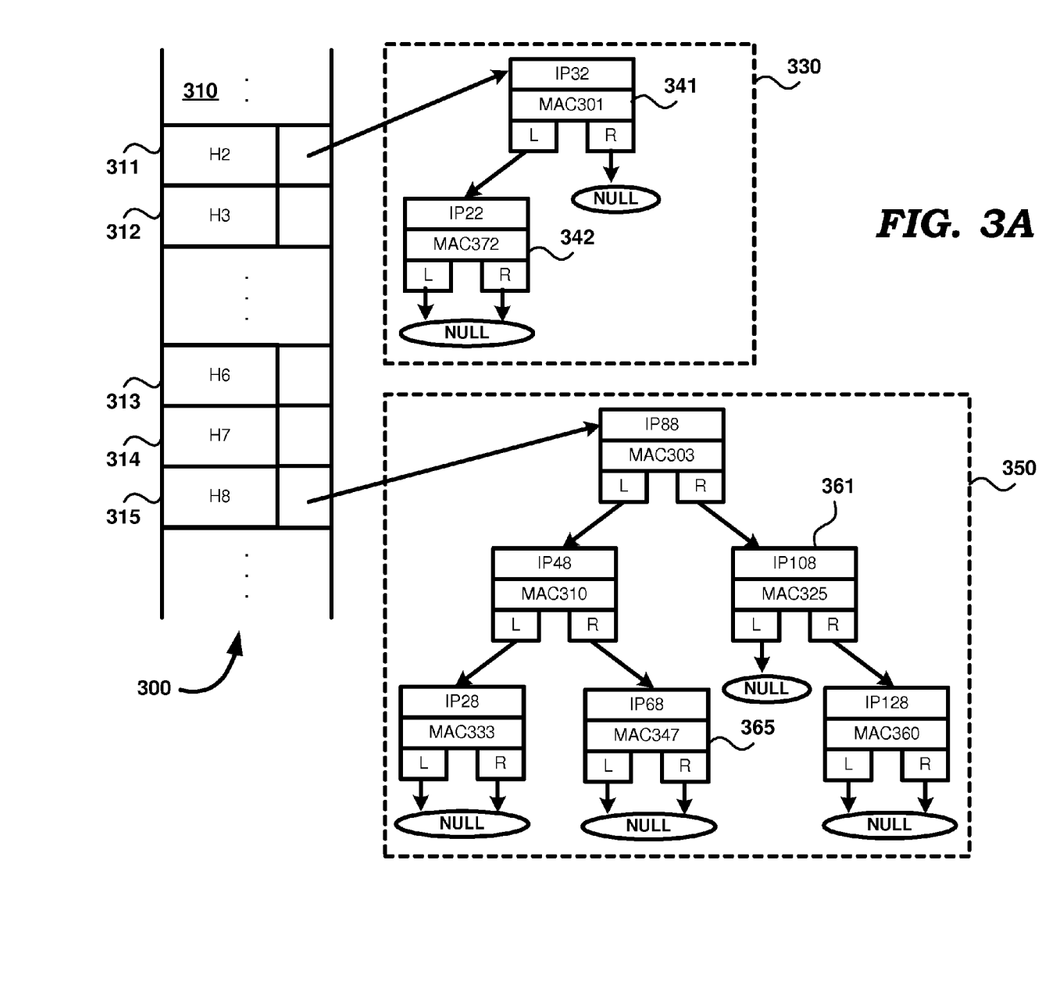
FIG. 3A illustrates the manner in which maintains a neighbor data structure in the form of a hash table containing multiple buckets for storing mapping entries is maintained in one embodiment.
Figure 3B:
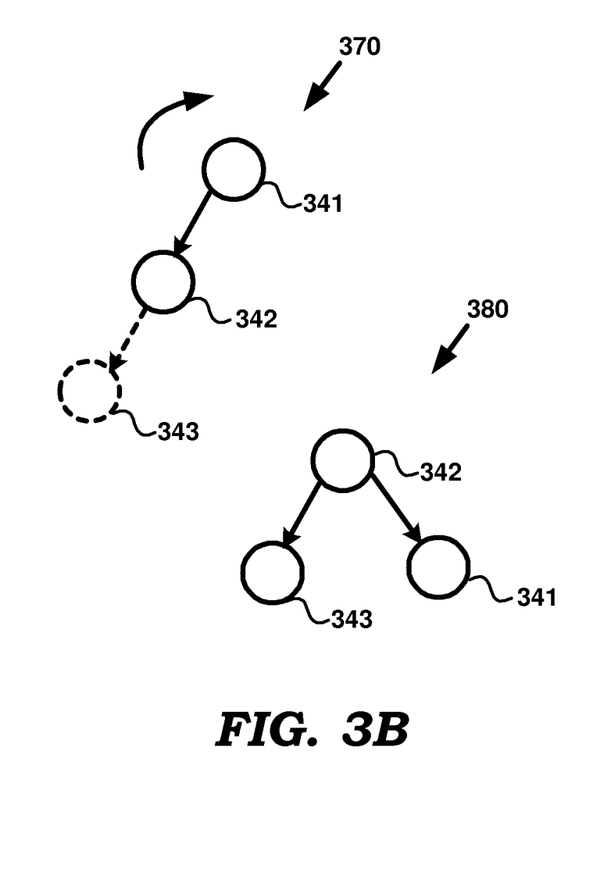
FIG. 3B logically illustrates the desired rotation of an unbalanced tree to ensure that the resulting tree is balanced in one embodiment.
Figure 4:
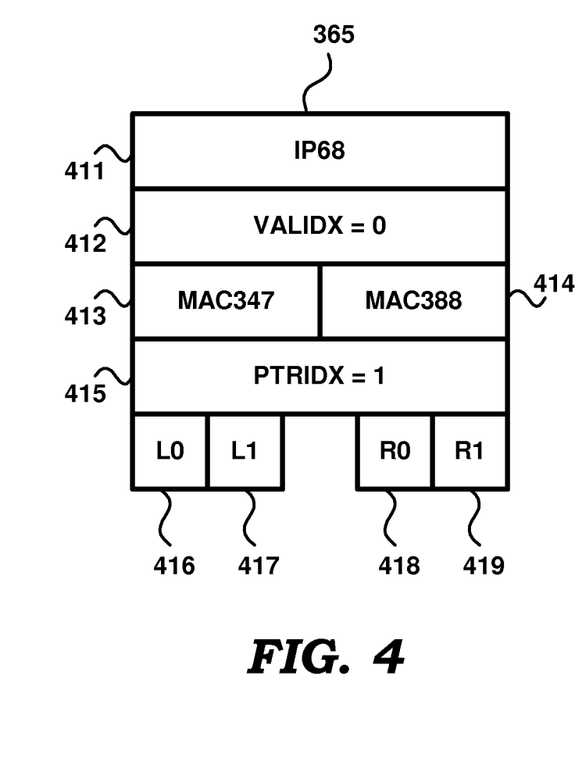
FIG. 4 illustrates the manner in which each node of a balanced tree of a neighbor data structure is implemented for concurrent processing in one embodiment.

FIGS. 3A, 3B and 4 together illustrates the manner in which neighbor lookup operations are performed in a network node (150A) in one embodiment. Each of the Figures is described in detail below.

FIG. 3A is shown containing object 300, which in turn is shown containing hash table 310 and two balanced trees 330 and 350. Though only two trees are shown for illustration, several more trees will typically be present associated with object 300 as described below.

Object 300 represents a data structure that is used to store mapping entries, with each mapping entry specifying a local/MAC address (of a neighbor node) corresponding to a global/IP address. Hash table 310 contains multiple buckets (e.g. 311-315). The hash table is based on a hash function that generates a corresponding hash value for each global address sought to be stored. Each of the buckets (e.g. 311-315) is associated with a unique hash value and accordingly stores only the mapping entries for which the hash function generates the associated hash value.

The number of global addresses (M) and the number of hash values/buckets (H) generated by the hash function may be chosen/configured according to the requirements of the environment in which the network node (switch 150A) is operative.

However, In an embodiment, the global address corresponds to IPv6 address (as described in more detail in RFC 2460 entitled "Internet Protocol, Version 6 (IPv6) Specification") and the value of M may be configured to be 1048576 (in particular, $2^{20}$, where ^ is the exponential/power operator), while the value of H may be chosen to be 65536 ($2^{16}$). Accordingly, each of the buckets of the hash table may possibly store, at a maximum, N=M/H=16 mapping entries.

However, for ease of description, it is assumed that the number of global addresses (M) are from 0 to 999, and the hash function as being (global address mod 10), where "mod" is the modulus operator that returns the reminder of the division of the global address by the value 10. In other words, the hash function generates a number from 0 to 9 (H) as the hash value for each of the global addresses. It may be noted that the modulus operation generates the same hash value (e.g. 2) for multiple different global addresses (e.g., 22, 32, etc.), and accordingly causes collisions in the hash table. Accordingly, each of the buckets (such as 311-315) of the hash table may possibly store, at a maximum, N=M/H=1000/10=100 mapping entries.

Each of the hash values H2, H3, H6, H7, H8, etc., (shown in hash table 310 merely for ease of understanding) of the hash table is assumed to correspond to one of the numbers (0 to 9) as indicated by the index in the label (that is, H2=2, H3=3, H8=8, etc). Though only a few hash values and corresponding buckets are shown in FIG. 3A, it should be noted that the hash table may contain a number of buckets equaling the number of hash values, with each bucket being associated with a unique hash value generated by the hash function, as is well known in the relevant arts.

The description is continued illustrating the manner in which multiple mapping entries are stored in each bucket of the hash table in object 300 according to an aspect of the present disclosure.

5. Balanced Trees

Referring to FIG. 3A again, each bucket (such as a 311-315) of the hash table in object 300 is show as being implemented as a corresponding balanced tree (e.g., 330 and 350 corresponding to hash values H2 and H8 respectively). Each balanced tree contains a corresponding set of nodes (e.g. 341, 342, 361), with each node storing a corresponding mapping entry.

As is well known in the relevant arts, a balanced/self-balancing tree is a hierarchical data structure in which the height (the number of levels) of the tree is sought to be maintained minimal for the total number of nodes in the tree at any given time. An example of a balanced tree is a AVL (Adelson-Velskii and Landis') tree which is a binary self-balancing tree, where each node has a maximum of two child nodes. According to one convention, in relation to each node, the descendants having higher values (compared to the value of the node) are stored to the right, while descendants having lesser values are stored to the left (while maintaining a maximum of two children and ensuring minimal height). Such a convention enforces an order of traversal of the nodes of the tree as well as specific position for each data resource in the tree. The description is continued assuming that the balanced trees (such as 330 and 350) of object 300 are implemented as AVL trees.

Accordingly, each of balanced trees 330 and 350 is shown containing various nodes that are organized in the form of a binary tree. Each node (e.g., 341) is shown containing a global/IP address (IP32), a corresponding local/MAC address (MAC301) and two node pointers (L and R). The L node pointer points to the left child (and correspondingly the left sub-tree) of the node, while the R node pointer points to the right child (and correspondingly the right sub-tree) of the node. The value "NULL" represents a pre-defined value (for example, the value "0") that indicates that the pointer (such as L and R node pointers of node 342) does not point to/refer to a valid node, as is well known in the relevant arts.

Each of the global address IP32, IP22, IP88, etc. of object 300 is assumed to correspond to a global address by the index in the label (that is, IP32=32, IP22=22, IP88=88, etc), though each global address would be a IPv6 address, as also noted above. It may be observed that in each balanced tree (for example, 350), the global addresses (88, 28, 108, etc.) of the mapping entries generates the same unique hash value (8) associated with the bucket (H8), upon applying of the hash function (modulus 10 hash function noted above). It may be further observed that each of the balanced trees has the minimum height (2 for tree 330 and 3 for tree 350) for the corresponding total number of nodes (2 nodes in tree 330 and 5 nodes in tree 350).

Thus, when storing mapping information from IPv6 addresses to MAC addresses, object 300 represents a neighbor data structure maintained in a network node such as switch 150A. The manner in which object 300 is used by switch 150A for processing lookup requests for global addresses is described below with examples.

6. Processing Lookup Operations

In response to receiving a lookup request containing a global address (assumed to be 108, for purposes of FIG. 3A), switch 150A first applies the hash function (modulus 10) to the received global address to generate the hash value 8, and correspondingly determines bucket 315 as containing the mapping entry for the received global address. Switch 150A then traverses balanced tree 350 corresponding to the determined bucket 315 to find a node/mapping entry (361) having a global address (IP108) equalling the received global address (108).

As is well known in the art, a traversal of a balanced tree refers to accessing multiple nodes of the tree until a desired data resource (here, the mapping entry) is reached, or to identify data resources with desired attributes (a mapping entry having the received global address). Traversal entails examining content of a node and determining any next nodes to access (based on the examined content), and access such determined next nodes. For AVL trees, the received global address (search value) is compared to the global address (node value) in the root node (presently traversed node) and traversal continues via the node to the left of the root node as the presently traversed node, if the search value is less than the node value. Otherwise traversal continues to the right, with the right child becoming the presently traversed node (as per the order enforced by the convention of the AVL trees).

After traversing balanced tree 350 to identify node 361, switch 150A examines the mapping entry (pair of IP108 and MAC325) stored in node 361 to identify a local address (MAC325) corresponding to the received global address (108). In the scenario that the global address 108 is an address of a next network node (end system 140A) to which a packet is to be forwarded, switch 150A forwards the packet to end system 140A on LAN170A using the local address MAC325.

Thus, neighbor lookup operations are performed in a network node (switch 150A) using the neighbor data structure/object 300. It should be noted that by implementing each bucket of the hash table as a balanced tree, the maximum number of node accesses for finding a matching node/mapping entry for a received global address is L=log 2(N), where 'log 2' is the logarithm to the base 2 operator and N is the maximum number of nodes in the bucket/balanced tree.

Thus, for the maximum number of nodes in a bucket N=100 (=1000/10), the maximum number of memory accesses for a lookup operation L=log 2(100)=(approx) 6.65<7. In other words, the local address corresponding to each global address (0 to 999) can be determined in at most 7 memory accesses. In the above noted example, the local address MAC325 corresponding to the global address 108 is determined in 2 node accesses (root of balanced tree 350 and node 361 using the right (R) pointer of the root node).

In the IPv6 example noted above, with number of global addresses (M) equaling, 2^20, (where ^ is the exponential/power operator) and the number of buckets (H) chosen to be 65536 (2^16), the maximum number of nodes accessed for any lookup (L)=log 2(M/H)=log 2(2^20/2^16)=log 2(16)=4.

By having such a fixed upper bound on the number of memory accesses (resulting from the maximum number of nodes required to be accessed) required for processing a lookup operation, the network node (switch 150A) is facilitated to provide a higher throughput performance when processing lookup operations.

The description is continued illustrating the manner in which change operations (such as adding/deleting mapping entries, changing the values of the mapping entries, etc.) are performed in neighbor data structure/object 300 in one embodiment.

7. Performing Change Operations

In general, performance of a change operation entails identifying the bucket in which the new/changed mapping entry is to be added, and then performing the change operation on the balanced tree corresponding to the identified bucket. For example, in response to receiving a request to add a new mapping entry containing a new global address (assumed to be 12 for illustration) and a second local address (MAC392), switch 150A first hashes (using the modulus 10 hashing function) the new global address 12 to the hash value 2, which equals the hash value H2 associated with bucket 311.

Switch 150A then adds the new mapping entry as a new node to balanced tree 330 corresponding to bucket 311. Since there is a previously existing mapping entry, the new node is added below the root node (341). Some of the challenges presented in addition, or in general change operations on trees, are first described below.

As is well known, the performance of a change operation on a balance tree may correspond to updating the data resource (mapping entry) stored in a node of the balanced tree or changing the structure/topology of the tree by adding/deleting nodes or even shifting the nodes (moving the position of a node to a different position in the balanced tree). Switch 150A first identifies a parent node (342) to which the new node is to be added as a child according to an order (convention noted above) required by the balanced tree, and then checks whether inclusion of the new node as the child of parent node 342 would cause imbalance in the balanced tree.

If the imbalance is caused, switch 150A changes the topology of the balanced tree, with the addition of the new node to ensure that the resulting tree is again balanced.

As is well known, each node of an AVL tree is associated with a balance factor, which represents a difference of the height of the sub-tree to the right and that to the left. In view of the self-balancing approach of AVL trees, each node would have a balance factor of −1, 0 or +1. When balance factor of +2 or −2 is obtained at a given node (that is, an imbalance), the sub-tree from that level needs to be balanced by the appropriate rotation(s).

Turning to the addition of the new node, it may be appreciated the new node is to be added as a left child of parent node 342 according to the order enforced by the convention of AVL trees. As shown at 370 in FIG. 3B, such intended addition (as node 343, shown in dotted circle) would cause an imbalance at root node 341. In particular, the height of nodes to the left of root pointer 341 is 2, while the height of the nodes to the right of root pointer 341 is 0. Accordingly a rotation is required to rebalance the tree.

FIG. 3B further logically illustrates the desired rotation of an unbalanced tree to ensure that the resulting tree is balanced in one embodiment. Tree portion 380 depicts the rotated (to right, as shown by the arrow there) topology for obtaining the balancing required of AVL trees. As may be readily observed, node 341 is the root node in tree portion 370, while node 342 is the root node in tree portion 380. Tree portion 380 (or all nodes thereof) is balanced, as the height on both sides of the tree is 1. The manner in which adding/deleting of nodes and corresponding rotations of AVL trees may be performed is described in further detail in the related applications noted above.

According to an aspect of the present disclosure, the throughput performance of network node 150A is sought to be increased by employing parallel processing techniques. In particular, there may be multiple execution entities, where one of them adds/deletes/changes mapping entries in accordance with FIG. 2A, while the other multiple execution entities work concurrently to process corresponding lookup requests. As noted in the Related Applications as well, if multiple execution entities are available for performing write operations, one of the entities may be chosen using techniques such as write locks. Alternatively, all the write operations may be channeled through a single execution entity. The description is continued with respect to implementation of such concurrent processing.

8. Concurrent Processing

There are several challenges to implementing the neighbor data structure (300) noted above when a network node contains multiple execution entities that are capable of executing concurrently. For example, the network node may contain multiple processors operating independently to provide many threads, with several threads executing concurrently on corresponding data resources/mapping entries. Alternatively, a single processor may provide concurrent threads/execution units using time-slicing techniques well known in the relevant arts.

In such a scenario, the data resources/mapping entries are said to be shared with multiple execution entities needing to perform operations (lookup, change, etc.) on the same data resource, in potential durations that can overlap. In one prior approach, the sharing of the resources is enforced using locking constructs like semaphores and spinlocks, wherein a thread of execution first locks the desired shared resources prior to performing any operation, with the locking ensuring that other threads of execution are unable to access the locked resources. The use of locking in balanced tree generally implies that each tree operation (insert, delete, lookup, balance, update) must be performed under a lock, thus allowing only a single operation to be performed at a time on the tree.

To overcome the above challenges, the balanced trees of object 300 may be implemented according to several features described in further detail in the related applications noted above. In particular, to facilitate lookup operations (by potentially multiple execution entities) concurrent with update operations (by one of the execution entities), a pair of fields and an index field is maintained for each data resource (herein, the local/MAC address of a mapping entry). The index field generally indicates which ("current field") of the two fields (e.g., first field to start with) of the pair stores a current value for the data resource. The value of the current field is the value returned by lookup operations.

To facilitate lookup operations concurrent with adding/deleting of nodes and also change in topology of the balanced tree, a pair of pointer fields for each node pointer of a corresponding node in the balanced tree is maintained, with the status of one pointer field of each pair/node pointer storing the present pointer value marked as "current", and the other pointer field of the pair marked as "alternate". The performing of the change operation of a same node in a balanced tree is permitted using the "alternate" pointer field, marked as alternate, while the lookup operation of the same node is permitted using the "current" pointer field.

FIG. 4 illustrates the manner in which each node of a balanced tree of a neighbor data structure is implemented for such concurrent processing in one embodiment. The description is provided with respect to node 365 in balanced tree 350 merely for illustrations, and the other nodes of the same/other balanced trees in object 300 may be similarly implemented.

Node 365 is shown containing nine fields. Field 411 stores the global address (here IP68) of the mapping entry, while fields 413 and 414 are the two fields for storing the local address of the mapping entry. Field 412 (VALIDX) indicates the specific one of field 413 and field 414 storing the current data value/local address (which is to be returned by lookup operations). According to a convention, a value of 0 for VALIDX (implemented as a single bit) indicates that field 413 currently contains the current value, while a value of 1 for VALIDX indicates that field 414 currently contains the current value. The value of 0 in field 412 indicates that a lookup operation for the global address 68 would return the local address MAC347

Similarly, fields 416 and 417 (L0 and L1) represent the pair of pointer fields corresponding to the left node pointer, while fields 418 and 419 (R0 and R1) represent the pair of pointer fields corresponding to the right node pointer. Field 415 (PTRIDX) indicates the pointer fields that are to be marked as "current" and "alternative" for both of the left and right node pointers. In other words, PTRIDX indicates whether the pair (L0 and R0, when PTRIDX=0) is operative or the pair (L1 and R1, when PTRIDX=1) is operative at the corresponding time instance for the purpose of lookup operations.

By implementing different pointers for storing values and also for performing operations on the balanced trees of object 300, several (concurrent) threads of execution are facilitated to perform lookup operations on the trees concurrent with another thread performing the change operations, without needing to obtain locks on the trees (or the specific set of nodes being accessed), as described in further detail in the related applications noted above, which are incorporated in their entirety herewith.

It should be appreciated that the features described above can be implemented in various embodiments as a desired combination of one or more of hardware, executable modules, and firmware. The description is continued with respect to an embodiment in which various features are operative when executable modules are executed.

9. Digital Processing System

Figure 5:
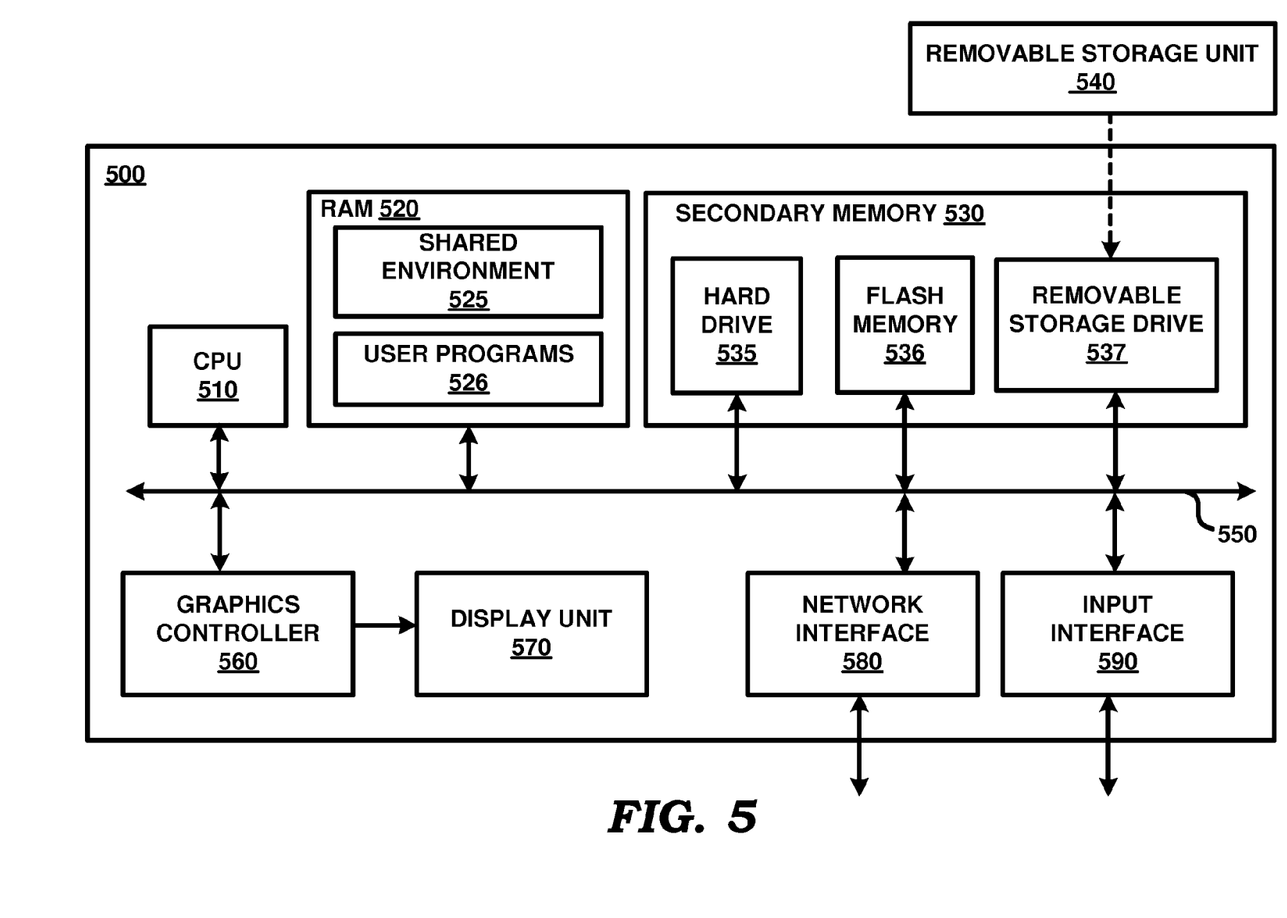
FIG. 5 is a block diagram illustrating the details of a digital processing system in which various aspects of the present disclosure are operative by execution of appropriate executable modules.

FIG. 5 is a block diagram illustrating the details of digital processing system 500 in which various aspects of the present disclosure are operative by execution of appropriate executable modules. Digital processing system 500 may correspond to any network node (such as switch 150A) in FIG. 1.

Digital processing system 500 may contain one or more processors such as a central processing unit (CPU) 510, random access memory (RAM) 520, secondary memory 530, graphics controller 560, display unit 570, network interface 580, and input interface 590. All the components except display unit 570 may communicate with each other over communication path 550, which may contain several buses as is well known in the relevant arts. The components of FIG. 5 are described below in further detail.

CPU 510 may execute instructions stored in RAM 520 to provide several features of the present disclosure. CPU 510 may contain multiple processing units, with each processing unit potentially being designed for a specific task. The multiple processing units can execute in parallel to create various concurrently executing threads (examples of execution entities), at least some of which may access shared data resources. Alternatively, CPU 510 may contain only a single general-purpose processing unit, which may also provide concurrent threads/execution entities. In such a scenario, concurrent execution entities may be implemented, for example, using time-slicing techniques well known in the relevant arts.

RAM 520 may receive instructions from secondary memory 530 using communication path 550. RAM 520 is shown currently containing software instructions constituting operating environment 525 and/or other user programs 526. In addition to operating environment 525, RAM 520 may contain other software programs such as device drivers, virtual machines, etc., which provide a (common) run time environment for execution of other/user programs. The shared data resources (e.g., hash table and balanced trees described above) may be stored in RAM 520. Though shown as a single unit usable by CPU 510, RAM 520 may be viewed as containing multiple units, with some of the units being contained in specific components (e.g., network interface 580) to store the shared resources accessed in accordance with the features of the present disclosure.

Graphics controller 560 generates display signals (e.g., in RGB format) to display unit 570 based on data/instructions received from CPU 510. Display unit 570 contains a display screen to display the images defined by the display signals. Input interface 590 may correspond to a keyboard and a pointing device (e.g., touch-pad, mouse) and may be used to provide inputs.

Network interface 580 provides connectivity to a network and may be used to communicate with other systems connected to the network (such as the other network nodes of FIG. 1). As may be appreciated, the network may be implemented according to Internet Protocol (IP) which is tolerant to transient inconsistencies of incorrect mappings (or stale data). Aspects of the present disclosure take advantage of such situation to provide non-blocking performance of lookup requests, as described with examples in combination with the Related Applications noted above.

Secondary memory 530 may contain hard drive 535, flash memory 536, and removable storage drive 537. Secondary memory 530 may store the data (for example, the hash table and AVL/balanced trees of FIG. 3A, and the node details of FIG. 4) and software instructions (for implementing the steps of FIG. 2A, 2B and other features noted above), which enable digital processing system 500 to provide several features in accordance with the present disclosure. The code/instructions stored in secondary memory 530 may either be copied to RAM 520 prior to execution by CPU 510 for higher execution speeds, or may be directly executed by CPU 510.

Some or all of the data and instructions may be provided on removable storage unit 540, and the data and instructions may be read and provided by removable storage drive 537 to CPU 510. Removable storage unit 540 may be implemented using medium and storage format compatible with removable storage drive 537 such that removable storage drive 537 can read the data and instructions. Thus, removable storage unit 540 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 540 or hard disk installed in hard drive 535. These computer program products are means for providing software to digital processing system 500. CPU 510 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 530. Volatile media includes dynamic memory, such as RAM 520. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 550. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

10. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method performed in a network node, said method comprising:

maintaining a neighbor data structure for storing mapping entries, each mapping entry specifying a local address corresponding to a global address, said neighbor data structure being in the form of a hash table containing a plurality of buckets, said hash table being based on a hash function that generates a corresponding hash value for each global address, wherein each bucket is associated with a unique hash value, wherein each bucket of said plurality of buckets is implemented as a corresponding balanced tree of a plurality of balanced trees, each balanced tree containing a corresponding set of nodes, with each node storing a corresponding mapping entry, wherein, upon applying of said hash function, corresponding global address of mapping entries in each balanced tree generates the unique hash value associated with the bucket;

receiving a lookup request containing a first global address;

determining a first bucket of said plurality of buckets by applying said hash function to said first global address; and traversing a first balanced tree corresponding to said first bucket to find a first mapping entry having a global address equaling said first global address.

2. The method of claim 1, wherein said first global address is an address of a next network node to which a packet is to be forwarded, said method further comprising:

examining said first mapping entry to identify a local address; and forwarding said packet to said next network node on a local network using said local address.

3. The method of claim 2, wherein said network node is a router, said next network node is an end system, wherein said first global address is a destination global address of said end system.

4. The method of claim 2, wherein said network node is a first end system, said next network node is a second end system, wherein said first global address is a destination global address of said second end system.

5. The method of claim 1, further comprising:

forming a second mapping entry containing a second global address and a second local address;

hashing said second global address to a first hash value using said hash function, said first hash value equaling the hash value associated with said first bucket; and adding said second mapping entry as a second node to said first balanced tree corresponding to said first bucket.

6. The method of claim 5, wherein said adding comprises:
determining whether said first hash value for said second global address causes a collision in said hash table,
wherein said adding adds said second node as a root of said first balanced tree if said collision is not determined, and adds said second node below said root otherwise.

7. The method of claim 6, wherein said adding said second node below said root comprises:
identifying a parent node to which said second node is to be added as a child according to an order required by said first balanced tree;
checking whether inclusion of said second node as said child of said parent node would cause imbalance in said first balanced tree; and
if said imbalance is caused, changing the topology of said first balanced tree, with the addition of said second node to ensure that the resulting tree is again balanced.

8. The method of claim 5, further comprising:
receiving a second request to change a mapping entry in a third node of said first balanced tree and a third request to lookup said mapping entry in said third node, wherein said second request and said third request are respectively processed by a first execution entity and a second executing entity executing concurrently in said network node; and
permitting non-blocking access to said third node to both of said first execution entity and said second execution entity, thereby enabling the change of said mapping entry and said lookup to be performed concurrently.

9. A non-transitory machine readable medium storing one or more sequences of instructions for enabling a network node to perform neighbor lookup operations, wherein execution of said one or more instructions by one or more processors contained in said network node enables said network node to perform the actions of:
maintaining a neighbor data structure for storing mapping entries, each mapping entry specifying a local address corresponding to a global address, said neighbor data structure being in the form of a hash table containing a plurality of buckets,
said hash table being based on a hash function that generates a corresponding hash value for each global address, wherein each bucket is associated with a unique hash value,
wherein each bucket of said plurality of buckets is implemented as a corresponding balanced tree of a plurality of balanced trees, each balanced tree containing a corresponding set of nodes, with each node storing a corresponding mapping entry,
wherein, upon applying of said hash function, corresponding global address of mapping entries in each balanced tree generates the unique hash value associated with the bucket;
receiving a lookup request containing a first global address;
determining a first bucket of said plurality of buckets by applying said hash function to said first global address; and
traversing a first balanced tree corresponding to said first bucket to find a first mapping entry having a global address equaling said first global address.

10. The non-transitory machine readable medium of claim 9, wherein said first global address is an address of a next network node to which a packet is to be forwarded, further comprising one or more instructions for:

examining said first mapping entry to identify a local address; and
forwarding said packet to said next network node on a local network using said local address.

11. The non-transitory machine readable medium of claim 10, wherein said network node is a router, said next network node is an end system, wherein said first global address is a destination global address of said end system.

12. The non-transitory machine readable medium of claim 10, wherein said network node is a first end system, said next network node is a second end system, wherein said first global address is a destination global address of said second end system.

13. The non-transitory machine readable medium of claim 9, further comprising one or more instructions for:
forming a second mapping entry containing a second global address and a second local address;
hashing said second global address to a first hash value using said hash function, said first hash value equaling the hash value associated with said first bucket; and
adding said second mapping entry as a second node to said first balanced tree corresponding to said first bucket.

14. The non-transitory machine readable medium of claim 13, wherein said adding comprises:
determining whether said first hash value for said second global address causes a collision in said hash table,
wherein said adding adds said second node as a root of said first balanced tree if said collision is not determined, and adds said second node below said root otherwise.

15. The non-transitory machine readable medium of claim 14, wherein said adding said second node below said root comprises:
identifying a parent node to which said second node is to be added as a child according to an order required by said first balanced tree;
checking whether inclusion of said second node as said child of said parent node would cause imbalance in said first balanced tree; and
if said imbalance is caused, changing the topology of said first balanced tree, with the addition of said second node to ensure that the resulting tree is again balanced.

16. A network node comprising:
a processor;
a random access memory (RAM);
a machine readable medium to store one or more instructions, which when retrieved into said RAM and executed by said processor causes said network node to perform neighbor lookup operations, said network node performing the actions of:
maintaining a neighbor data structure for storing mapping entries, each mapping entry specifying a local address corresponding to a global address, said neighbor data structure being in the form of a hash table containing a plurality of buckets,
said hash table being based on a hash function that generates a corresponding hash value for each global address, wherein each bucket is associated with a unique hash value,
wherein each bucket of said plurality of buckets is implemented as a corresponding balanced tree of a plurality of balanced trees, each balanced tree containing a corresponding set of nodes, with each node storing a corresponding mapping entry,
wherein, upon applying of said hash function, corresponding global address of mapping entries in each balanced tree generates the unique hash value associated with the bucket;

receiving a lookup request containing a first global address;

determining a first bucket of said plurality of buckets by applying said hash function to said first global address; and traversing a first balanced tree corresponding to said first bucket to find a first mapping entry having a global address equaling said first global address.

17. The network node of claim 16, wherein said first global address is an address of a next network node to which a packet is to be forwarded, said network node further performing the actions of:

examining said first mapping entry to identify a local address; and forwarding said packet to said next network node on a local network using said local address.

18. The network node of claim 16, further performing the actions of:

forming a second mapping entry containing a second global address and a second local address;

hashing said second global address to a first hash value using said hash function, said first hash value equaling the hash value associated with said first bucket; and adding said second mapping entry as a second node to said first balanced tree corresponding to said first bucket.

19. The network node of claim 18, wherein for said adding, said network node performs the actions of:

determining whether said first hash value for said second global address causes a collision in said hash table, wherein said adding adds said second node as a root of said first balanced tree if said collision is not determined, and adds said second node below said root otherwise.

20. The network node of claim 19, wherein for said adding said second node below said root, said network node performs the actions of:

identifying a parent node to which said second node is to be added as a child according to an order required by said first balanced tree;

checking whether inclusion of said second node as said child of said parent node would cause imbalance in said first balanced tree; and if said imbalance is caused, changing the topology of said first balanced tree, with the addition of said second node to ensure that the resulting tree is again balanced.

21. The network node of claim 18, further comprising:

receiving a second request to change a mapping entry in a third node of said first balanced tree and a third request to lookup said mapping entry in said third node, wherein said second request and said third request are respectively processed by a first execution entity and a second executing entity executing concurrently in said network node; and permitting non-blocking access to said third node to both of said first execution entity and said second execution entity, thereby enabling the change of said mapping entry and said lookup to be performed concurrently.

* * * * *

UNITED STATES PATENT AND TRADEMARK OFFICE
CERTIFICATE OF CORRECTION

| | | |
|---|---|---|
| PATENT NO. | : 9,270,636 B2 | |
| APPLICATION NO. | : 14/246160 | |
| DATED | : February 23, 2016 | |
| INVENTOR(S) | : Narasimhamurthy et al. | |

It is certified that error appears in the above-identified patent and that said Letters Patent is hereby corrected as shown below:

Specification

In column 11, line 45, after "MAC347" insert -- . --.

In column 13, line 1, delete "FIG." and insert -- FIGS. --, therefor.

Signed and Sealed this
Eighteenth Day of October, 2016

Michelle K. Lee
*Director of the United States Patent and Trademark Office*